United States Patent [19]

Carlson et al.

[11] 3,761,491

[45] Sept. 25, 1973

[54] 1-SUBSTITUTED-5-NITROIMIDAZOL-2-YLALKYL-(N-SUBSTITUTED)-CARBAMATES

[75] Inventors: John A. Carlson, Nassau, N.Y.; Dale R. Hoff, Basking Ridge, N.J.; Clarence S. Rooney, Beaconsfield, Quebec, Canada

[73] Assignee: Merck & Co., Inc., Rahway, N.J.

[22] Filed: Nov. 12, 1971

[21] Appl. No.: 198,438

Related U.S. Application Data

[60] Division of Ser. No. 855,765, Sept. 5, 1969, Pat. No. 3,646,027, which is a continuation-in-part of Ser. No. 550,932, May 18, 1966, abandoned, which is a continuation-in-part of Ser. No. 470,239, July 7, 1965, abandoned.

[52] U.S. Cl................................. 260/309, 424/273
[51] Int. Cl............................................ C07d 49/36
[58] Field of Search...................................... 260/309

[56] References Cited
UNITED STATES PATENTS

| | | | |
|---|---|---|---|
| 3,299,090 | 1/1967 | Hoff et al............................. | 260/309 |
| 3,325,507 | 6/1967 | Kollonitisch......................... | 260/309 |
| 3,378,552 | 4/1968 | Henry.................................. | 260/309 |

*Primary Examiner*—Natalie Trousof
*Attorney*—Hesna J. Pfeiffer et al.

[57] ABSTRACT

1-Substituted-5-nitroimidazol-2-ylalkyl carbamates containing N-acyl substituents, and acid addition salts thereof are prepared from 1-substituted-5-nitroimidazoles having at the 2-position of the imidazole ring an hydroxyalkyl, mercaptoalkyl, haloalkyl, halo-carbonylalkyl or halothiocarbonyloxyalkyl radical. The 1-substituted-5-nitroimidazol-2-ylalkyl-(N-substituted)-carbamates are useful in the treatment of parasitic diseases. Antiparasitic compositions in which the active ingredient is a 1-substituted-imidazol-2-ylalkyl-(N-substituted)-carbamate are also provided.

9 Claims, No Drawings

1-SUBSTITUTED-5-NITROIMIDAZOL-2-YLALKYL-(N-SUBSTITUTED)-CARBAMATES

CROSS REFERENCE TO RELATED APPLICATIONS:

This application is a divisional application of our co-pending application U. S. Ser. No. 855,765 filed Sept. 5, 1969 now U. S. Pat. 3,646,027, which in turn was a continuation-in-part application of co-pending U. S. Serial No. 550,932 filed May 18, 1966 now abandoned, which in turn, was a continuation-in-part application of U. S. Ser. No. 470,239 filed July 7, 1965 and now abandoned.

DESCRIPTION OF THE PREFERRED EMBODIMENTS:

This invention relates to new chemical compounds. More particularly, it relates to novel imidazole carbamates. It is concerned further with chemical synthesis of such substances and with novel imidazole compounds useful as intermediates in such synthesis. In addition, it is concerned with antiparasitic compositions containing the imidazole carbamates of this invention as active ingredients.

One object of this invention is to provide new and useful 1-substituted-imidazol-2-ylalkyl, N-substituted carbamates and acid addition salts thereof. It is also an object to provide 1-substituted-5-nitroimidazol-2-ylalkyl-(N-substituted)-carbamates which have antiparasitic activity. Another object is to provide methods for making these compounds from 1-substituted-5-nitroimidazoles having at the 2-position of the imidazole ring, a hydroxyalkyl, mercaptoalkyl, haloalkyl, halocarbonyloxyalkyl, or halothiocarbonyloxyalkyl radical.

A further object is to provide compositions useful against parasitic diseases, for example, trichomoniasis, enterohepatitis and as antihelminthic compositions against ascarids and schistosomes. Certain of them are also effective against amoebiasis and trypanosomiasis as well as chronic respiratory diseases in fowl and swine caused by PPLO organisms. Certain of the compositions of the present invention also show antibacterial activity. In these compositions, 1-substituted-5-nitroimidazol-2-ylalkyl-(N-substituted)-carbamates are present as active ingredients.

The novel imidazole carbamates of this invention may be represented by the following structural formulae:

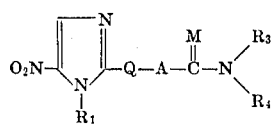

I in which $R_1$ is loweralkyl having 1–5 carbon atoms, Q is loweralkylene or lower alkylidene having 1–4 carbon atoms, A and M are each oxygen or sulfur, $R_3$ is hydrogen, and $R_4$ is acyl, for example, alkanoyl, suitably loweralkanoyl, such as, formyl, acetyl, propionyl, butyryl, or valeryl; aralkanoyl, suitably phenylloweralkanoyl, such as phenylacetyl; cyanoalkanoyl, suitably cyanoloweralkanoyl, such as cyanoacetyl or cyanopropionyl; haloalkanoyl, suitably haloloweralkanoyl such as chloroacetyl; alkenoyl, suitably loweralkenoyl, such as acryloyl or crotonyl; and aroyl, such as benzoyl.

Also within the purview of the invention are acid addition salts of these imidazole carbamates. The salt may be of an inorganic acid such as the hydrochloride, hydrobromide, phosphate, nitrate or sulfate, or of an organic acid, examples of which are the citrate, tartrate, adipate, methanesulfonate, p-toluenesulfonate and the like. Nontoxic acid addition salts, i.e., those tolerated by the host at the dose levels employed, are employed when the carbamates are to be used in their salt form as anti-parasitic agents.

The preferred compounds of this invention are the 1-substituted-5-nitroimidazol-2-ylalkyl N-acyl carbamates. More specifically, the preferred compounds are the imidazolylalkyl carbamates of the invention as shown in Formula I supra, wherein Q is loweralkylene suitably methylene or ethylene, or loweralkylidene suitably 1-ethylidene, $R_1$ is alkyl such as methyl or ethyl, and the sub-group

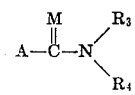

wherein A is oxygen or sulfur, M is oxygen or sulfur and $R_3$ is hydrogen and $R_4$ is lower-alkanoyl having 1–5 carbon atoms, chloroacetyl, cyanoacetyl, phenylacetyl, loweralkenoyl having 3–5 carbon atoms, or benzoyl. These preferred embodiments will be discussed at more length than others in the description of the invention. The following explanations of processes apply to most substances embraced by the generic formula I.

In accordance with the present invention, there are provided chemical syntheses of these novel imidazolylalkyl carbamates.

THE GENERAL PROCESSES:

i. The Imidazole Halocarbonate Process

One process for making the carbamates of this invention consists in reaction of the halocarbonate or halothioncarbonate ester of 1-substituted-2-hydroxyalkyl-(or 2-mercaptoalkyl)-5-nitroimidazole with a primary or secondary amine. The reaction may be schematically represented as follows:

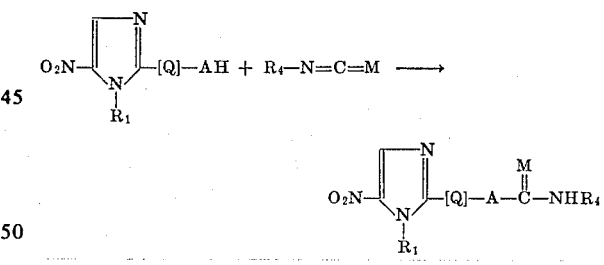

wherein Q, A, M, $R_1$, and $R_4$ are as above.

In the preferred modification of this process, the significance of the substituents is as follows:

Q is loweralkylene suitably methylene or ethylene; or loweralkylidene suitably ethylidene;

$R_1$ is loweralkyl suitably methyl, ethyl, or propyl;

A and M each represent oxygen or sulfur;

$R_4$ represents acyl suitably loweralkanoyl, such as acetyl, propionyl or butyryl, cyanoacetyl, chloroacetyl, phenylacetyl, loweralkenoyl, or aroyl such as benzoyl.

The isocyanate reaction of the above flow diagram is conveniently brought about by contacting the imidazole and substituted isocyanate (or isothiocyanate) reactants, preferably in equimolar amounts or with a slight molar excess of isocyanate (or isothiocyanate), in an inert solvent medium at a temperature of between about 20°–120° C. Aromatic hydrocarbons such as benzene and toluene, or halogenated aliphatic hydrocarbons, e.g., dichloro- or tetrachloroethane are examples of suitable solvents. It is desirable to have present a minor amount of base such as a tertiary amine, e.g., pyridine or triethylamine, or even stronger bases such as alkali metal alkoxides, such as sodium methoxide or potassium ethoxide, since the reaction is base catalyzed.

Examples of imidazolylalkyl carbamates which may be obtained in this manner from the appropriate nitroimidazole are 1-methyl-5-nitroimidazol-2-ylmethyl benzoylcarbamate, and 1-methyl-5-nitroimidazol-2-ylmethyl acetyl-carbamate.

ii. N'-(5-Nitroimidazol-2-ylalkoxycarbonyl) $N^2,N^2$-dialkylformamidinium salts N'-(5-Nitroimidazol-2-ylalkoxycarbonyl)-$N^2,N^2$-dialkylformamidinium halides may be prepared by reacting a 5-nitroimidazol-2-ylalkyl carbamate with a dialkylformamide in the presence of a thionyl halide. In the preferred procedure, a 5-nitroimidazol-2-ylalkyl carbamate, suitably a 1-$R_1$-5-nitroimidazol-2-ylmethyl carbamate, wherein $R_1$ is as shown on page 2 above provided that $R_1$ is other than hydroxyalkyl, carboxyalkyl, or carbamoylalkyl, is dissolved in an excess of dialkylformamide, suitably dimethylformamide and a small excess of a thionyl halide, such as thionyl chloride is added thereto. The mixture is allowed to stand at a temperature of from about 15° C. to about 30° C. for from about 12 to about 24 hours. In the preferred method of isolation, the product is obtained as a crystalline precipitate and is separated from the reaction mixture for filtration.

Among the compounds which may be produced in accordance with this procedure are N'-(1-methyl-5-nitroimidazol-2ylmethoxycarbonyl) $N^2,N^2$-dimethylformamidinium chloride hydrochloride, N'-(1-methyl-5-nitroimidazol-2-ylmethoxy carbonyl) $N^2,N^2$-dimethylformamidinium bromide hydrobromide, N'-(1-ethyl-5-nitroimidazol-2-ylmethoxycarbonyl) $N^2,N^2$-dimethylformamidinium chloride hydrochloride, and N'-(1-acetoxy-ethyl-5-nitroimidazol-2-ylmethoxycarbonyl) $N^2,N^2$-dimethyl-formamidinium chloride hydrochloride.

ii. 5-Nitroimidazol-2-ylalkyl N-formylcarbamates

5-Nitroimidazol-2-ylalkyl N-formylcarbamates may be produced by reacting an N'-5-nitroimidazol-2-ylalkoxy-carbonyl) $N^2,N^2$-dialkylformamidinium halide hydrohalide in a mild alkaline hydrolyzing agent. In the preferred modification of the procedure, an N'-(1-$R_1$-5-nitroimidazol-2-ylmethoxycarbonyl) $N^2$, $N^2$-dialkylformamidinium halide hydrohalide, as produced in accordance with the aforementioned procedure, is dissolved in a mild aqueous base, a solution of sodium bicarbonate in water being preferred, and the solution allowed to stand at a temperature of 15° to 30° C. for from about 12 to about 24 hours. The product may be isolated as the residue by filtration.

The 1-substituted-2-imidazolylalkyl-(N-substituted)-carbamates above have antiprotozoal activity, and are particularly active against the causative organisms of the protozoal parasitic diseases trichomoniasis and enterohepatitis. Certain of them are also effective against amoebiasis and trypanosomiasis, as well as against the PPLO organisms and schistosomes. It will, of course, be understood that the compounds differ in their degree of efficacy against these various organisms.

Trichomoniasis is a protozoan disease caused by parasites of the genus Trichomonas. The compounds of the invention are effective against the particularly troublesome form of trichomoniasis known as T. vaginalis vaginitis, caused by infestation of the vagina with T. vaginalis. In treating this disease, the imidazolylalkyl carbamates may be administered either orally or topically. For oral administration unit dosage, forms such as tablets or capsules are normally employed which may contain from about 50 to about 500 mg. of active ingredient. These are prepared by techniques known in the art, and contain the usual diluents, granulating agents, extenders and/or lubricating agents known to be satisfactory for the compounding of tablets and capsules. It is preferred to administer the compounds of the invention orally at a dose level of from about 25 – 1,000 mg./day, in either single or divided doses with divided doses being used more frequently than a single daily dose. An example of a suitable compressed tablet is the following:

| Component | Mg. per Tablet |
|---|---|
| 1-Mehyl-5-nitroimidazol-2-ylmeth-yl-N-acetyl carbamate | 250 |
| Dicalcium phosphate | 100 |
| Lactose | 75 |
| Starch | 50 |
| Guar gum | 12 |
| Magnesium stearate | 2–3 |

If desired, tablets may be sugar coated or enteric coated by standard techniques. Alternatively, the antitrichomonal agent may be formulated in capsule form using fillers such as lactose, starch or kaolin. A typical capsule would contain 250 mg. of, for instance, 1-methyl-5-nitroimidazol-2-ylmethyl methyl N-acetyl carbamate, 2–3 g. of magnesium stearate and about 75 mg. of lactose in a No. 0 size capsule. Tablets and capsules containing smaller quantities of active ingredient may be made by reducing proportionately the amounts of excipients and diluents illustrated above. Alternatively, the carbamates may be administered orally in liquid pharmaceutical vehicles such as solutions, emulsions, syrups or suspensions containing the diluents, flavoring agents and preservatives customarily employed in the pharmaceutical art.

For topical application, vaginal creams or suppositories containing the active ingredient may be used. To illustrate, a cream is prepared by mixing sufficient quantities of hydrophilic ointment and water, containing from about 5–10% by weight of carbamate, in sufficient quantities to produce a cream having the desired consistency.

Enterohepatitis is a disease occuring primarily in turkeys and is caused by the protozoan parasite Histomonas meleagridis. It is also known as turkey blackhead disease. The imidazolylalkyl carbamates of this invention are useful in the prevention and treatment of this disease and for this purpose are administered to turkeys mixed with an element of turkey sustenance, i.e. in the feed or drinking water. Although the optimum dose level will depend on the particular compound employed and the severity of the infection, good control of enterohepatitis is obtained by orally administering to the turkeys a feed containing from about 0.003 percent to about 0.1 percent by weight of carbamate. When the material is administered via the drinking water, somewhat higher levels may be employed, especially for therapeutic use. For instance, the drinking water may contain up to about 0.2 percent by weight of the active ingredient with good results. Those substances previously mentioned as preferred antitrichomonal agents are also among those preferred in combating turkey blackhead.

As previously stated, the imidazolylalkyl carbamate described herein may also be employed against trypanosomiasis and amoebiasis. In addition, certain of them, and particularly 1-methyl-5-nitroimidazol-2-ylmethyl N-acetyl carbamate, possess activity against the pleuro-penumonia like organisms which have come to be known as PPLO organisms.

The imidazolylalkyl carbamates are effective against PPLO organisms when the compound is administered to fowl or swine in feed containing from about 0.003 percent to about 0.1 percent by weight of carbamate. The preferred dosage level, however, is between from about 0.003 percent to 0.08 percent by weight.

The following examples are given for the purpose of illustration and not by way of limitation.

In addition, preparation of the starting materials can be found in U.S. Pat. No. 3,458,528 or Belgium Patent 683,796 issued Jan. 9, 1967, an equivalent of the disclosure in U.S. Ser. No. 550,932 filed May 18, 1966, now abandoned, a parent application of the instant application. methyl.

3. The compound of claim 2 in which Q is methylene.
4. The compound of claim 3 in which both A and M are oxygen.
5. The compound of claim 4 in which $R_4$ is loweralkanoyl.
6. The compound of claim 5 in which R4 is acetyl.
7. The compound of claim 5 in which R4 is formyl.
8. The compound of claim 4 in which R4 is chloroacetyl.
9. The compound of claim 4 in which R4 is benzoyl.

EXAMPLE 1

1-Methyl-5-Nitroimidazol-2-yl-methyl Chloroformate 3.12 G. 1-methyl-2-hydroxymethyl-5-nitroimidazole is dissolved in a mixture of 4.3 ml. of dimethylaniline and 20 ml. of dioxane. This solution is then added dropwise to 30 ml. of phosgene. The resulting suspension is stirred for two hours at 0°–5° C., and then for 2 hours at room temperature. The solvent is then removed by blowing dry nitrogen through the suspension for two hours. The oil remaining at the end of this time consists predominantly of 1-methyl-5-nitroimidazol-2-ylmethyl chloroformate.

In accordance with the above procedure, but starting with 1-methyl-2-mercaptomethyl-5-nitroimidazole, in place of 1-methyl-2-hydroxymethyl-5-nitroimidazole, there is obtained 1-methyl-5-nitroimidazol-2-yl-methyl chlorothioformate.

In accordance with the above procedure and starting with either of the aforementioned nitroimidazoles but using thiophosgene in place of phosgene, there is obtained 1-methyl-5-nitroimidazol-2-yl-methyl chlorothioformate and 1-methyl-5-nitroimidazol-2-yl-methyl chlorodithioformate.

EXAMPLE 2

1-Methyl-5-Nitroimidazol-2-ylmethyl Carbamate 0.05 G. of 1-methyl-5-nitroimidazol-2-ylmethyl phenyl carbonate is dissolved slowly in 50 ml. of liquid ammonia. After solution is complete, the ammonia is permitted to evaporate and the residue washed with ethanol and recrystallized from methanol to yield 1-methyl-5-nitroimidazol-2-ylmethyl carbamate; m.p. 166°–170° C.

In accordance with the above procedure, but starting with 1-(1-methyl-5-nitroimidazol-2-yl)-ethyl phenyl carbonate, 2-(1methyl-5-nitroimidazol-2-yl)-ethyl phenyl carbonate and 3-(1-methyl-5-nitroimidazol-2-yl)-prop-2-en-1-yl phenyl carbonate in place of 1-methyl-5-nitroimidazol-2-yl-methyl phenyl carbonate there is obtained the corresponding 1-(1-methyl-5-nitroimidazol-2-yl)ethyl carbamate, 1-(1-methyl-5-nitroimidazol-2-yl)ethyl carbamate, and 3-(1-methyl-5-nitroimidazol-2-yl)prop-2-enyl carbamate.

EXAMPLE 3

1-Methyl-5-Nitroimidazol-2-ylmethyl Thiolcarbamate 1.35 G. of 1-methyl-2-chloromethyl-5-nitroimidazole is dissolved in 25 ml. of dry ethanol at room temperature, and 1.11 g. of potassium thiocyanate is added to this solution. The resulting mixture is refluxed for two hours and then allowed to stand at room temperature for about 12 hours. It is warmed to about 75° C. on a steam bath and the solid material removed by filtration. The filtrate is diluted with an equal volume of water and the resulting solution chilled and scrateched to induce crystallization. The solid which forms is removed by filtration, washed with ice-water and dried. It is 1-methyl-2-thiocyanomethyl-5-nitroimidazole; m.p. 87°–88° C. This product is crystallized from a minimum volume of benzene containing a trace of hexane to give yellow crystals of 1-methyl-2-thiocyanomethyl-5-nitroimidazole; m.p. 87.5°–88° C.

5 G. of 1-methyl-2-thiocyanomethyl-5-nitroimidazole is added portionwise over a period of 15 minutes to 25 ml. of cold concentrated sulfuric acid. The resulting solution is held at 0° C. for about 14 hours and then poured onto an excess of crushed ice. The solution is adjusted to pH 6 with saturated potassium bicarbonate solution. The solid material is removed by filtration and washed with ice-water. The solid is extracted with about 10 ml. of ethyl acetate and the ethyl acetate solution dried over sodium sulfate and then concentrated essentially to dryness. A small volume of hexane is added to the residue and the solid 1-methyl-5-nitro-2-imidazolymethyl thiolcarbamate removed by filtration. There are obtained in this way 4.34 g. of 1-methyl-5-nitroimidazol-2-ylmethyl thiolcarbamate; m.p. 138°–140° C.

EXAMPLE 4

1-Methyl-5-Nitroimidazol-2-ylmethyl Carbamate

1-Methyl-5-nitroimidazol-2-ylmethyl chloroformate as obtained in accordance with Example 1 is cooled to 0° C. and 25 ml. of liquid ammonia added thereto. The resulting mixture is stirred for 10 minutes in the cold and then an additional 25 ml. of liquid ammonia is added. The mixture is then allowed to warm to room temperature and stirred until the excess ammonia evaporates. The residue thus obtained is dissolved in 100 ml. of water and the aqueous solution extracted with three 100 ml. portions of ethyl acetate. The ethyl acetate extracts are combined, backwashed with 25 ml. of water and then dried over sodium sulfate. The ethyl acetate is then concentrated to dryness in vacuo to give a residue consisting of 1-methyl-5-nitroimidazol-2-ylmethyl carbamate. The product is recrystallized from ethyl acetate and then from water to give substantially pure material; m.p. 172°–173° C.

In accordance with the above procedure but starting with 1-methyl-5-nitroimidazol-2-ylmethyl chlorothiolformate, 1-methyl-5-nitroimidazol-2-ylmethyl chlorothionformate, 1-methyl-5-nitroimidazol-2-ylmethyl chlorodithioformate in place of 1-methyl-5-nitroimidazol-2-ylmethyl chloroformate, there is obtained the corresponding 1-methyl-5-nitroimidazol-2-ylmethyl thiolcarbamate, 1-methyl-5-nitroimidazol-2-ylmethyl thioncarbamate, and 1-methyl-5-nitroimidazol-2-ylmethyl dithiocarbamate.

EXAMPLE 5

1-Methyl-5-Nitroimidazol-2-ylmethyl Thiolcarbamate 3.5 G., (.02 mole) of 1-methyl-2-mercapto methyl-5-nitroimidazole is dissolved in 100 ml. of benzene and 25 ml. of pyridine under nitrogen. 1.9 G., (0.022 mole) of gaseous carbamoyl chloride is introduced into the stirred solution. The solution is allowed to stand at 15° C. for 8 hours and then concentrated under reduced pressure. The residue is taken up in ethyl acetate, washed with ice-water and the ethyl acetate extract dried over sodium sulfate. On evaporation of the solvent under reduced pressure, the residue is recrystallized from acetone or ethyl acetate to yield 1-methyl-5-nitroimidazol-2-ylmethyl thiolcarbamate; m.p. 138°–140° C.

In accordance with the above procedure but using dimethylcarbamoyl chloride or diethylcarbamoyl chloride and adding these reagents in liquid rather than gaseous form to the reaction mixture in place of carbamoyl chloride, there is obtained the corresponding 1-methyl-5-nitroimidazol-2-ylmethyl N,N-dimethylthiolcarbamate and 1-methyl-5-nitroimidazol-2-ylmethyl N,N-diethylthiolcarbamate.

In accordance with the above procedure but using thiocarbamoyl chloride and dimethylthiocarbamoyl chloride and diethylcarbamoyl chloride, in place of carbamoyl chloride, there is obtained 1-methyl-5-nitroimidazol-2-ylmethyl dithiocarbamate, 1-methyl-5-nitroimidazol-2-ylmethyl N,N-dimethyldithiocarbamate, and 1-methyl-5-nitroimidazol-2-ylmethyl N,N-diethyldithiocarbamate.

EXAMPLE 6

1-Methyl-5-Nitroimidazol-2-ylmethyl Methylthioncarbamate 0.5 G. of 1-methyl-2-hydroxymethyl-5-nitroimidazole and 0.28 g. of methyl isothiocyanate are added to 20 ml. of benzene containing 0.54 ml. of triethylamine. The resulting mixture is refluxed for 23 hours. It is then concentrated amost to dryness in vacuo and the solid material removed by filtration. This product is 1-methyl-5-nitroimidazol-2-ylmethyl methylthioncarbamate; m.p. 133.5°–135° C. It is recrystallized from water to give substantially pure material; m.p. 135.5°–136° C.

In accordance with the above procedure, but starting with 1-methyl-2-mercaptomethyl-5-nitroimidazole, in place of 1-methyl-2-hydroxymethyl-5-nitroimidazole, there is obtained the corresponding 1-methyl-5-nitroimidazol-2-yl-methyl dithiocarbamate.

EXAMPLE 7

N-(1-Methyl-5-Nitroimidazol-2-ylmethyloxycarbonyl)-N', N'-Dimethylformamidinium Chloride Hydrochloride 0.2 G. (0.001 moles) of 1-methyl-5-nitroimidazol-2-ylmethyl carbamate is dissolved in 2 ml. of dimethylformamide and 0.1 ml. of thionyl chloride added. The mixture is allowed to stand for 18 hours. Removal of the crystalline precipitate by filtration followed by washing with ether yields N-(1-methyl-5-nitroimidazol-2-ylmethyl oxycarbonyl N', N'-dimethylformamidinium chloride hydrochloride; m.p. 147°–151° C. (dec.).

EXAMPLE 8

1-Methyl-5-Nitroimidazol-2-ylmethyl Formylcarbamate 3.28 G. (0.01 mole) of N-(1-methyl-5-nitroimidazol-2-ylmethoxycarbonyl) N', N'-dimethylformamidinium chloride hydrochloride is dissolved in 20 ml. of water containing 0.84 g. of sodium bicarbonate. The solution is allowed to stand overnight. The product is 1-methyl-5-nitroimidazol-2-ylmethyl formylcarbamate. The same compound is obtained on heating on a steam bath 1-methyl-5-nitroimidazol-2-ylmethyl carbamate in an excess of 90% formic acid overnight.

EXAMPLE 9

1-Methyl-5-Nitroimidazol-2-ylmethyl N-Acetylcarbamate

2 G. of 1-methyl-5-nitroimidazol-2-ylmethyl carbamate is added to a mixture of 40 ml. of acetic anhydride and 4 drops of concentrated sulfuric acid. The solution is heated for 18 hours on a steam bath. The solvent is removed under reduced pressure and the residue triturated with petroleum ether and the mixture filtered. The residue is taken up in hot benzene, the mixture filtered and the filtrate concentrated under reduced pressure to a small volume. After standing at 5° C. for 12 hours, 1-methyl-5-nitroimidazol-2-ylmethyl N-acetylcarbamate, m.p. 140°–142° C., is obtained on filtration.

In accordance with the above procedure, but using propionic anhydride, butyric anhydride, or chloroacetic anhydride, in place of acetic anhydride there is obtained the corresponding 1-methyl-5-nitroimidazol-2-ylmethyl N-propionylcarbamate, 1-methyl-5-nitroimidazol-2-ylmethyl N-butyrylcarbamate, and 1-methyl-5-nitroimidazol-2-yl methyl N-chloroacetylcarbamate.

EXAMPLE 10

1-Methyl-5-Nitroimidazol-2-ylmethyl Acetylcarbamate 5.9 G. of 1-methyl-2-hydroxymethyl-5-nitroimidazole and about 0.5 ml. of pyridine are added to a solution of acetyl isocyanate prepared by refluxing a solution of 15.9 g. oxyalyl chloride, and 5.9 g. of acetamide in 300 ml. of 1,2-dichloroethane for 16 hours and the mixture refluxed for 80 minutes. The solvent is then removed by concentration in vacuo to give an oil which crystallizes on standing. The crystals are slurried with 50 ml. of benzene and then recovered by filtration. Washing with a mixture of 50 ml. of benzene and 85 ml. of ether leaves crude 1-methyl-5-nitroimidazol-2-ylmethyl acetylcarbamate; m.p. 108°–132° C. On recrystallization from benzene-hexane, substantially pure material is obtained; m.p. 132°–135° C.

In accordance with the above procedure, but using benzoylisocyanate or phenylacetylisocyanate, in place of acetylisocyanate, there is obtained the corresponding 1-methyl-5-nitroimidazol-2-ylmethyl N-benzoylcarbamate, and 1-methyl-5-nitroimidazol-2-ylmethyl N-phenylacetylcarbamate.

Similarly, in accordance with the above procedure, but using 1-methyl-2-mercaptomethyl-5-nitroimidazole and 1-ethyl-2-hydroxymethyl-5-nitroimidazole, in place of 1-methyl-2-hydroxymethyl-5-nitroimidazole and utilizing benzoylisocyanate, there is obtained the corresponding 1-methyl-5-nitroimidazol-2-ylmethyl N-benzoylthiolcarbamate and 1-ethyl5-nitroimidazol-2-ylmethyl N-benzyolcarbamate.

EXAMPLE 11

1-Methyl-5-Nitroimidazol-2-ylmethyl N-Cyanoacetylcarbamate

2 G. (0.01 mole) of 1-methyl-5-nitroimidazol-2-yl carbamate, 0.93 g. (0.011 mole) of cyanoacetic acid and 10 ml. of acetic anhydride are heated on a steam bath for 3 hours. On cooling, a crystalline product is obtained. Recrystallization from ethanol gives 1-methyl-5-nitroimidazol-2-ylmethyl N-cyanoacetylcarbamate.

EXAMPLE 12

1-Methyl-5-Nitroimidazol-2-ylmethyl N-Acryloylcarbamate

To a solution of 2.0 g. (0.01 mole) of 1-methyl-5-nitroimidazol-2-ylmethyl carbamate in 5 ml. of dimethylformamide at 0° C. is added slowly 1.13 g. of acryloyl chloride. The mixture is allowed to warm to room temperature and stand for 8 hours. 10 Ml. of water is added slowly and the product 1-methyl-5-nitroimidazol-2-ylmethyl N-acryloylcarbamate is removed by filtration.

In accordance with the above procedure, but using crotonoyl chloride, in place of acryloyl chloride, there is obtained the corresponding 1-methyl-5-nitroimidazol-2-yl-methyl N-crotonoylcarbamate.

What is claimed is:

1. The compound of the formula:

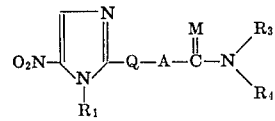

I wherein $R_1$ is loweralkyl of 1–5 carbon atoms, Q is lower-alkylene or loweralkylidene of 1–4 carbon atoms, A and M are each oxygen or sulfur, $R_3$ is hydrogen, and $R_4$ is loweralkanoyl of 1–5 carbon atoms, chloroacetyl, cyanoacetyl, phenylacetyl, loweralkenoyl of 3–5 carbon atoms, or benzoyl.

2. The compound of claim 1 in which $R_1$ is methyl.
3. The compound of claim 2 in which Q is methylene.
4. The compound of claim 3 in which both A and M are oxygen.
5. The compound of claim 4 in which $R_4$ is loweralkanoyl.
6. The compound of claim 5 in which $R_4$ is acetyl.
7. The compound of claim 5 in which $R_4$ is formyl.
8. The compound of claim 4 in which $R_4$ is chloroacetyl.
9. The compound of claim 4 in which $R_4$ is benzoyl.

* * * * *